358-190. OR 3,793,482 SR 8/190

United States Patent [19]

Thompson

[11] 3,793,482

[45] Feb. 19, 1974

[54] TELEVISION LINE OSCILLATOR AND LINE DRIVER CIRCUIT ARRANGEMENTS

[75] Inventor: Donald George Thompson, London, England

[73] Assignee: U.S. Philips Corporation, New York, N.Y.

[22] Filed: July 10, 1972

[21] Appl. No.: 270,468

[30] Foreign Application Priority Data

July 8, 1971 Great Britain .................... 32170/71

[52] U.S. Cl. ...... 178/7.3 R, 178/7.5 R, 178/DIG. 11

[51] Int. Cl. ............................................. H04n 5/44

[58] Field of Search ........ 178/7.3 R, 7.5 R, 7.1, 7.2, 178/DIG. 11

[56] References Cited

UNITED STATES PATENTS

| | | | |
|---|---|---|---|
| 3,594,499 | 7/1971 | Sansone et al. | 178/7.3 R |
| 3,621,134 | 11/1971 | Waring | 178/DIG. 11 |
| 3,629,497 | 12/1971 | Soardi et al. | 178/DIG. 11 |
| 3,641,267 | 2/1972 | Cavallari | 178/DIG. 11 |

*Primary Examiner*—Benedict V. Safourek
*Assistant Examiner*—Jin F. Ng
*Attorney, Agent, or Firm*—Frank R. Trifari; Henry I. Steckler

[57] ABSTRACT

A power supply for a low voltage television line oscillator is derived from a D.C. load to the line dirver stage, a winding coupled to the driver transformer providing an additional supply coupled to the D.C. load.

4 Claims, 1 Drawing Figure

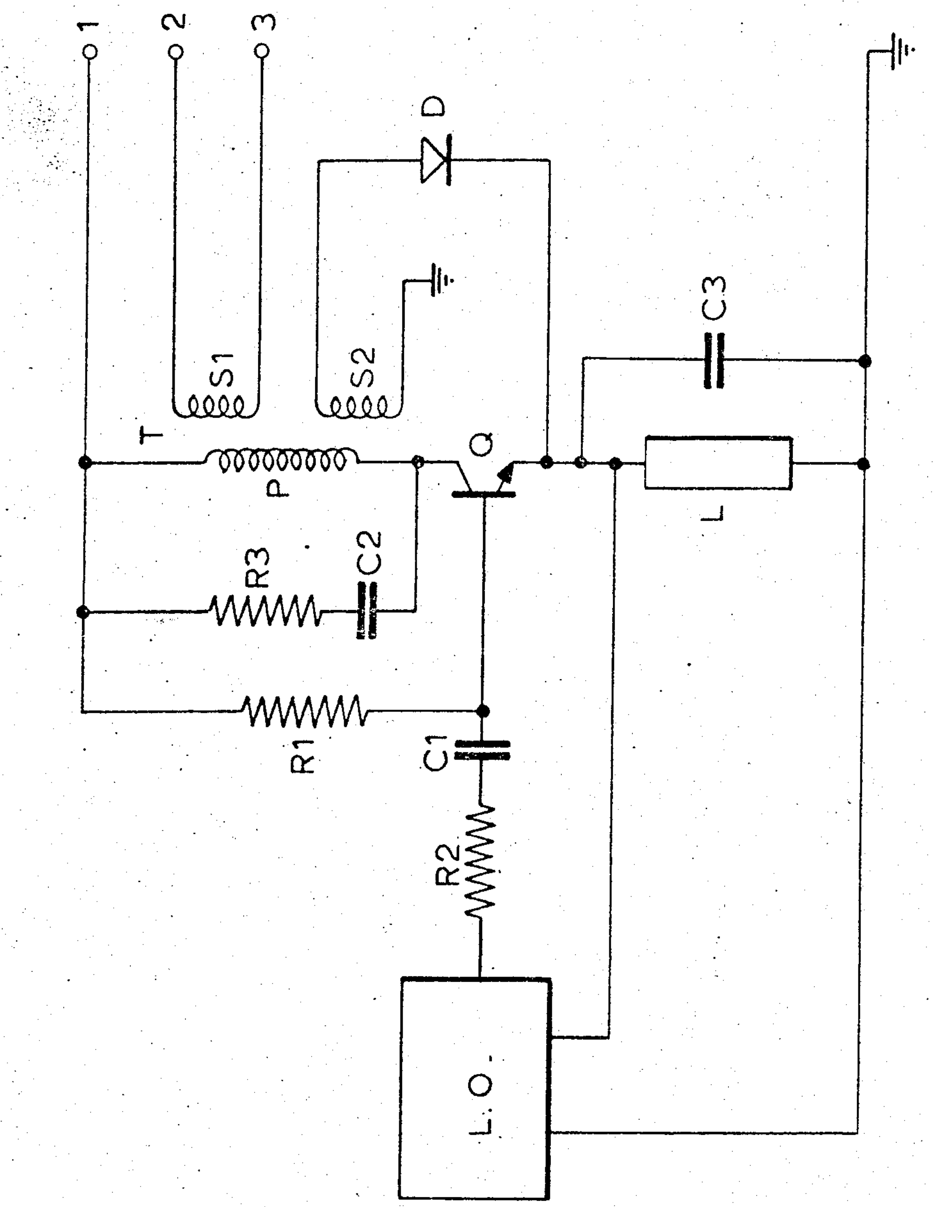
1
2
3
D
S1
S2
T
P
Q
C3
L
R3
C2
R1
C1
R2
L.O.

TELEVISION LINE OSCILLATOR AND LINE DRIVER CIRCUIT ARRANGEMENTS

The present invention relates to a circuit arrangement incorporating the line oscillator and line driver circuits of a television receiver and in particular to the power supplies associated with these circuits.

In current television receivers and especially colour television receivers employing high voltage transistors in at least parts of the line time base stage it is quite usual to provide the supply required for the time base from a controlled thyristor power supply arrangement. With the requirement for current in these receivers it is preferable to operate the thyristor so as to produce a direct output supply voltage of 200 volts with an alternating mains supply of 240 volts.

Such a high direct voltage supply is generally suitable for the line driver and line output circuits and possibly the video amplifier circuits. The remaining circuits of a television receiver normally require a much lower voltage supply i.e. in the order of 20 or 30 volts or less and this is usually obtained in receivers without mains transformers by the rectification during the scan period of a supply derived from a winding on the line output transformer. Difficulty however, is experienced where a low voltage supply is also required for the oscillator stage as this cannot directly be derived from the low voltage scan rectified supply as this supply will not be available until the line oscillator circuit is operative. It is of course possible to derive a supply for the line oscillator circuit from the 200 volt supply but the current required by this circuit could give rise to a large dissipation in the necessary dropping resistor connected between the 200 volt line and the line oscillator circuit and would require a voltage stabilising element.

It is an object of the invention to provide a circuit arrangement of the type described in which the above difficulty is overcome.

The present invention provides a circuit arrangement incorporating the line oscillator and line driver circuits of a television receiver in which the line driver circuit is adapted to be energised from a supply having a voltage higher than that required for the line oscillator circuit, a d.c. load decoupled at line frequency being connected between one terminal for the supply and one terminal of the driver circuit, a further d.c. supply of a voltage lower than the first mentioned supply and derived from a winding on the driver transformer of said driver circuit being applied across the d.c. load from which load the line oscillator circuit derives its supply.

The line driver circuit may incorporate a transistor, the d.c. load being connected between the emitter of this transistor and the one terminal for the higher voltage supply.

In a preferred arrangement the line driver transformer will have a primary connected between a second terminal for the higher voltage supply and the collector of the transistor, the transformer being additionally provided with a first secondary for providing line drive to a line output circuit and a further secondary which forms the winding from which the lower voltage supply is derived. With such an arrangement a diode may be connected between one end of the further secondary and the d.c. load.

With a circuit arrangement according to the invention the line oscillator circuit could be formed as an integrated circuit.

The invention also provides a television receiver incorporating a circuit arrangement according to the invention.

The above and other features of the invention will be more readily understood by a perusal of the following description having reference to the accompanying drawing, the sole FIGURE of which is a circuit diagram of a circuit arrangement including the line oscillator and line driver circuits of a television receiver according to the invention.

Referring to the drawing a supply terminal 1 adapted to be connected to the positive terminal of high voltage d.c. supply in television receiver (of the order of 200 volts) is connected through the primary P of a line driver transformer T to the collector of a line driver transistor Q. The negative terminal for the high voltage supply is connected to earth, the emitter of the transistor Q being connected through a d.c. load L to earth and hence the negative terminal of the high voltage supply, the load L being decoupled at line frequency by a capacitor C3. The line driver transformer T is provided with a first secondary winding S1 which is connected through terminals 2 and 3 respectively to the base and emitter of a line output transistor in a line output circuit (not shown). The line driver transformer T is additionally provided with a further secondary winding S2 one end of which is connected to earth whilst the other end is connected through a diode D poled in direction shown to the junction of the emitter of transistor Q and the load L. The primary of the line driver transformer T is shunted by an R.C. damping network comprising a resistor R3 and a capacitor C2. A line oscillator circuit LO shown only here in block form and which may be composed of discrete components or may preferably be formed as integrated circuit, has its pulse signal output 4 a.c. coupled through the series arrangement of a resistor R2 and capacitor C1 to the base of transistor Q, the base being additionally connected through a resistor R1 and terminal 1 to the positive terminal of the high voltage supply. The positive 5 and negative 6 supply terminals of the line oscillator circuit L0 are connected respectively to the junction of the emitter of transistor Q and load L and to earth.

The operation of the circuit arrangement especially so far as its supplies are concerned is as follows. Almost immediately after receiver switch-on the 200 volt supply is available between terminal 1 and earth and thus the supply is available between the collector and emitter path of transistor Q. In addition bias will be provided through resistor R1 for the base of transistor Q which will render the transistor conducting and cause the voltage across the d.c. load L to rise. Although most line oscillator circuits have a normal working voltage, they will in fact start to oscillate with a much lower supply voltage. If for instance the normal working voltage is 12 volts, the circuit may well commence to oscillate at a voltage much lower than this i.e. about 4 volts. Thus when the voltage across the load L rises above 4 volts the line oscillator circuit will commence oscillation and such oscillations will be applied through the components R2 and C1 to the base of the driver transistor Q. This transistor will then be switched at the normal line frequency so as to apply line driving pulses from the terminals 2 and 3 to the line output circuit. At the same time pulses of line frequency will also be generated across the winding S2 which are rectified during the flyback period by the diode D to produce a 12 volt supply for application across the load L. In addition with the normal line waveform applied to the base of transistor Q the current through this transistor will cause the voltage across the load also to be 12 volts. However, as current required by the line oscillator circuit will be well in excess of that available from the transistor Q and the supply derived from the winding S2 will therefore supplement the current requirements for the line oscillator circuit. Thus there is provided an arrangement which provides a supply for a low voltage line oscillator circuit which operates in combination with a high voltage line driver circuit, which is self starting and which does not produce any excessive dissipation in dropping resistors.

In a practical circuit arrangement according to the invention the following components and values were employed:

R1 — 100 k ohms
R2 — 220 ohms
R3 — 4.7 k ohms
L — 680 ohms
C1 — 68 n Farads
C2 — 3.3 n Farads
C3 — 470 n Farads
Q — BD 322 Mullard Limited
D — BA 145 Mullard Limited
T — Core FX3308 Mullard Limited
Bobbin DT 2205 Mullard Limited
Primary 500 turns 0.16 m.m. (37 S.W.G.) enamel copper wire
Secondary S1 12 turns 0.4 m.m. (27 S.W.G.) enamel copper wire
Secondary S2 32 turns 0.16 m.m. (37 S.W.G.) enamel copper wire In the above practical arrangement where the voltage applied to terminal 1 was 200 volts and the line oscillator circuit was an integrated circuit requiring a supply of 12 volts 50 m. amp, the line driver circuit required 35 – 40 m. amps whilst the current through the load L was in the order of 20 m. amps.

What I claim is:

1. A circuit arrangement comprising the line oscillator and line driver circuits of a television receiver in which said line driver circuit is adapted to be energised from a supply having a voltage substantially higher than that required for said line oscillator circuit, said driver circuit comprising a driver transformer and a transistor having a pair of conduction electrodes, a d.c. load decoupled at line frequency being connected between one terminal for said supply and one of said conduction electrodes, a further d.c. supply of a voltage lower than said first mentioned supply and derived from a winding on the driver transformer of said driving circuit being applied across said d.c. load from which load said line oscillator circuit derives its supply.

2. A circuit arrangement as claimed in claim 1, in which said line driver transformer has a primary connected between a second terminal for said higher voltage supply and the collector of said transistor, said transformer being additionally provided with a first secondary for providing line drive to a line output circuit and a further secondary which forms the winding from which said lower voltage supply is derived.

3. A circuit arrangement as claimed in claim 2, in which a diode is connected between one end of said further secondary and said d.c. load.

4. A circuit as claimed in claim 1 wherein said one conduction electrode comprises an emitter.

* * * * *